Aug. 6, 1940.    J. BOYER    2,210,614
LOG BUNK
Filed March 27, 1939    2 Sheets-Sheet 2
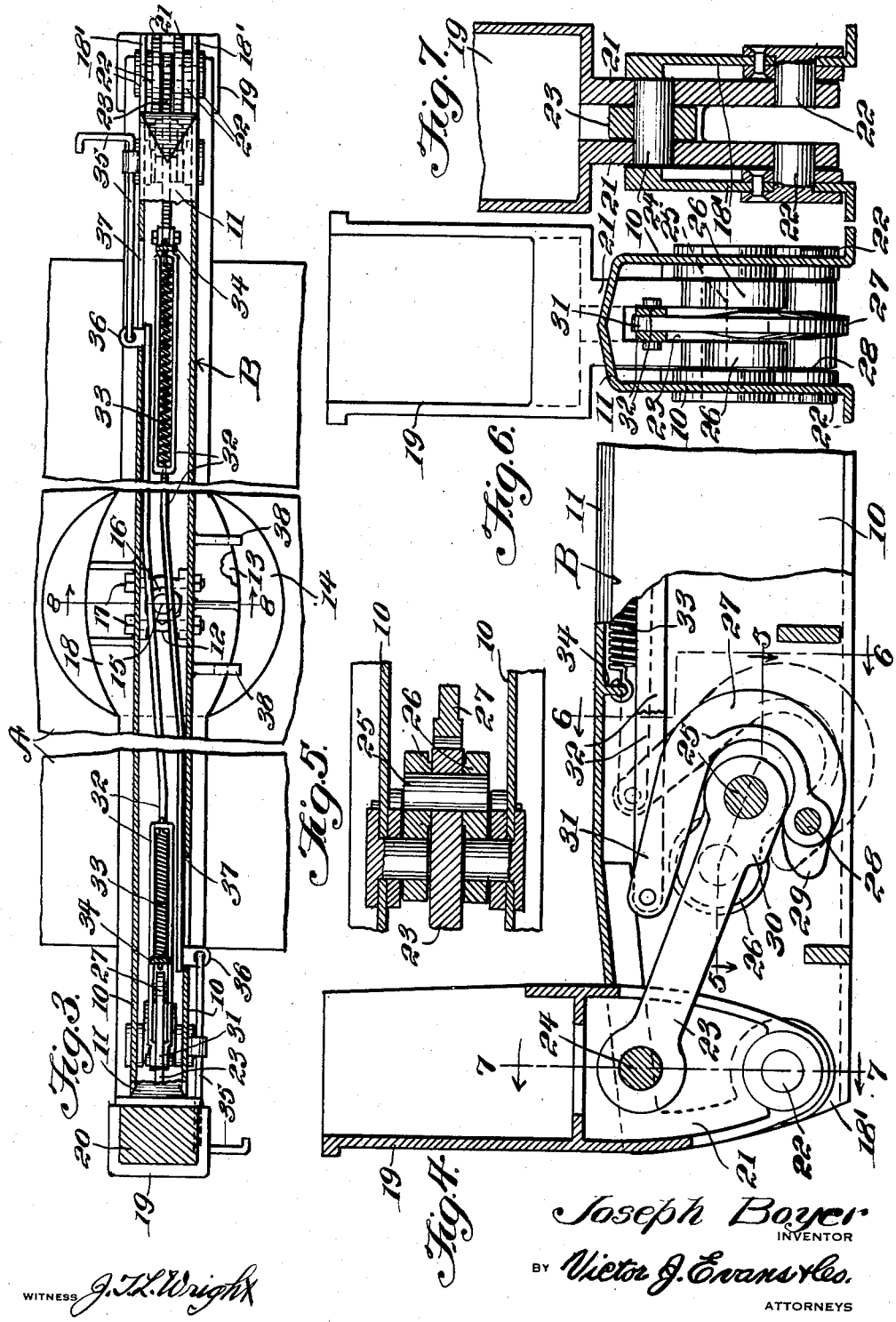
Joseph Boyer
INVENTOR
BY Victor J. Evans & Co.
ATTORNEYS
WITNESS J. K. Wright Patented Aug. 6, 1940

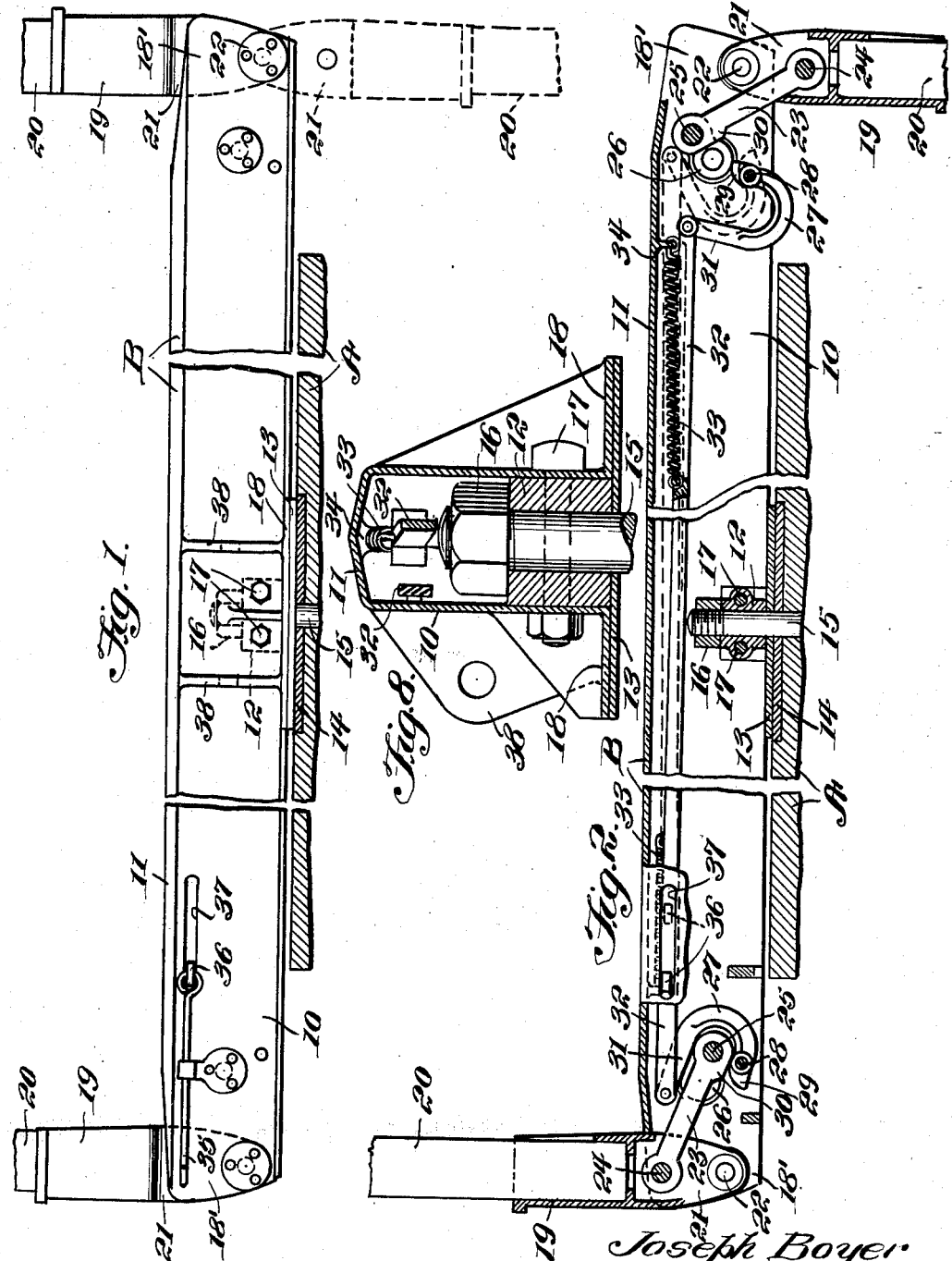

2,210,614

UNITED STATES PATENT OFFICE 2,210,614

LOG BUNK

Joseph Boyer, L'Anse, Mich., assignor of one-fourth to Leo J. Brennan, L'Anse, Mich.

Application March 27, 1939, Serial No. 264,495

3 Claims. (Cl. 280—145)

The invention relates to a log bunk adaptable for use on all types of vehicles, such as trucks, logging sleighs, railway cars or the like.

The primary object of the invention is the provision of a bunk of this character, wherein the same is supported in a manner to have turntable action and will support logs when loaded upon the vehicle, the stakes for retaining the load being susceptible for automatic operation and are controlled at opposite sides of the vehicle so that the load can be dumped from the vehicle without liability of injury to an operator when standing at one side or the other of such vehicle, the stakes being tripped automatically with assurance of safety to an operator and the loads can be placed upon or removed from the vehicle with dispatch.

Another object of the invention is the provision of a bunk of this character, whereby the logs can be readily delivered from the vehicle when loaded thereon in that the stakes are susceptible of vertical swing to load-sustaining positions or to load-releasing positions and in the latter will be out of the way so that the logs can roll off of the vehicle without interference.

A further object of the invention is the provision of a bunk of this character, wherein the stakes are disposed at opposite ends thereof and have association with suitable locking mechanism, which is adapted to positively hold the stake in its locked position, and these stakes are susceptible of being tripped from opposite sides of the vehicle and to drop clear of the load upon the vehicle to be entirely out of the way thereof during unloading operation.

A still further object of the invention is the provision of a bunk of this character, which is simple in its construction, susceptible for interchanging of the stakes, thoroughly reliable and efficient in operation, and inexpensive to manufacture and install.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 1 is a fragmentary vertical sectional view through a vehicle timber showing the bunk in side elevation, constructed in accordance with the invention, with the stakes in full lines in load-sustaining position and by dotted lines one of the stakes in an unloading position.

Figure 2 is a vertical longitudinal sectional view through the bunk.

Figure 3 is a horizontal sectional view thereof.

Figure 4 is a fragmentary enlarged vertical sectional view through one end of the bunk.

Figure 5 is a sectional view taken on the line 5—5 of Figure 4 looking in the direction of the arrows.

Figure 6 is a sectional view taken on the line 6—6 of Figure 4 looking in the direction of the arrows.

Figure 7 is a sectional view on the line 7—7 of Figure 4 looking in the direction of the arrows.

Figure 8 is a sectional view on the line 8—8 of Figure 3 looking in the direction of the arrows.

Similar reference characters indicate corresponding parts throughout the several views in the drawings.

Referring to the drawings in detail, A designates generally a portion of a flat floor timber of a vehicle while B is the bunk for logging purposes constructed in accordance with the invention and hereinafter fully described.

The body of the bunk is in the form of a steel casting although it may be made from any other suitable material and constitutes a bolster of sufficient length to reach entirely across the vehicle. The bolster body has side walls 10 and a top web 11, respectively, the bottom portion of the said bolster being open, while fitted centrally of this bolster between the side walls 10 is a king bolt block 12, being fixedly joined to a turntable 13 superimposed upon a bed plate 14 built within the timber A of the vehicle. Centrally fitted within the block 12 is a king bolt 15, being also extended through the bed plate 14 and carries a nut 16. The block 12 is bolted at 17 to the side walls 10 and these walls are outwardly flared at 18 next to the turntable 13, being welded or otherwise joined therewith. Thus the bolster B can be turned on the king bolt 15, the turntable 13 being turnable on the plate 14.

The bolster body has opposite ends open, these being bifurcated by cutting away the top web 11 for a distance thereof and in these bifurcated ends 18' are accommodated vertically swingable stake holders 19, a portion of each stake being indicated at 20, which is releasably socketed in the said holder 19. Each holder is formed with a forked pivot end 21 swingably engaged by stud pivots 22 fixedly fitted in the bifurcated ends 18' of the bolster body. Accommodated in each forked end 21 is a throw arm 23 pivoted at 24 to the holder 19 concentrically to the axis of swing thereof, the arm being also pivoted at 25 to an eccentric 26 journaled within the bolster in the side walls 10 thereof. Engageable with the arm 23 at the pivotal connection 25 thereof with the eccentric 26 is a swingable hook-like locking jaw 27, being pivoted at 28 within the said bolster at the bill end thereof and this bill end 29 constitutes a striker nose for an abutment or tripping shoulder 30 formed on the arm 23. The jaw 27 has pivoted to the stem end 31 thereof an actuator rod 32 connected with a coiled retractile spring 33 anchored at 34 within said bolster. The spring 33 operates to move the jaw 27 to locking position so that the holder 19 will be held in an upright perpendicular position and the stake 20 thereof sustaining a load of logs upon the vehicle.

The rod 32 has connected therewith an operating handle 35 slidably supported exteriorly of the bolster and located adjacent to one end thereof, the connection of the handle 35 with the rod 32 being indicated at 36, and this connection has a clearance by a slot 37 provided in the side wall 10 next thereto of the bolster. The handle 35 when pulled upon will release the jaw 27 from its locking position so that the holder 19 locked thereby can swing from an upright position to a lowered position at a point beneath the plane of the floor timber of the vehicle and more particularly beneath the top web 10 of the bolster B so that logs loaded upon the bunk can be delivered or discharged therefrom.

The holders 19 are operable from opposite sides of the vehicle. In other words, the holder at one side of the vehicle is operable from the other side thereof and in this way injury to an operator is avoided in the unloading of the vehicle.

When the jaw 27 releases the arm 23 and the eccentric 26 connected therewith a toggle action between the said arm and eccentric occurs allowing the stake holder 19 to swing vertically and on the unlocking of the jaw the nose 29 engages the shoulder 30 of the arm 23 initially moving the same to have the eccentric pass dead center and the holder then by its own weight through gravity swings to a releasing or unloading position. When the stake holder 19 has been swung vertically to an upright position, it becomes automatically locked by the jaw 27 companion thereto.

The bolster B at one side thereof has perforated ears 38, these being located at opposite sides of the king bolt 15, and retaining elements are attachable therewith to hold the bolster B from turning or turntable activity, the retaining elements being not shown.

The stakes 20 releasably socketed in the holders 19 are readily interchangeable and also susceptible of enabling the use of varying lengths of stakes for increasing or decreasing the loading capacity of the bunk.

What is claimed is:

1. The combination with a log bunk, of a vertically swingable stake holder pivoted to the bunk at an end thereof, movable to upright substantially vertical position above the bunk and reversely movable to a lowered position below the bunk, a throw arm pivoted to said holder, an eccentric turnable with said throw arm and swingable therewith on movement of the stake holder to upright and lowered positions, a locking hook jaw movable for engaging the said throw arm and having its hook pivoted for said engagement, a nose on the hook of said jaw and active upon the throw arm for initially moving the eccentric and the releasing of said throw arm from engagement with the said jaw, and means fitting the bunk and operable from one end thereof for moving the said jaw.

2. The combination with a log bunk, of a vertically swingable stake holder pivoted to the bunk at an end thereof, movable to upright substantially vertical position above the bunk and reversely movable to a lowered position below the bunk, a throw arm pivoted to said holder, an eccentric turnable with said throw arm and swingable therewith on movement of the stake holder to upright and lowered positions, a locking hook jaw movable for engaging the said throw arm and having its hook pivoted for said engagement, a nose on the hook of said jaw and active upon the throw arm for initially moving the eccentric and the releasing of said throw arm from engagement with the said jaw, means fitting the bunk and operable from one end thereof for moving the said jaw, and means cooperating with the first-named means to hold the jaw engaged with said throw arm.

3. The combination with a log bunk, of a vertically swingable stake holder pivoted to the bunk at an end thereof, movable to upright substantially vertical position above the bunk and reversely movable to a lowered position below the bunk, a throw arm pivoted to said holder, an eccentric turnable with said throw arm and swingable therewith on movement of the stake holder to upright and lowered positions, a locking hook jaw movable for engaging the said throw arm and having its hook pivoted for said engagement, a nose on the hook of said jaw and active upon the throw arm for initially moving the eccentric and the releasing of said throw arm from engagement with the said jaw, means fitting the bunk and operable from one end thereof for moving the said jaw, means cooperating with the first-named means to hold the jaw engaged with the said throw arm, and a handle exposed adjacent to the said opposite end of the bunk and operating the first-named means.

JOSEPH BOYER.